United States Patent [19]

Blaschke

[11] Patent Number: 4,638,673
[45] Date of Patent: Jan. 27, 1987

[54] METHOD AND APPARATUS FOR DETERMINING THE TORQUE OF A TORQUE GENERATOR

[75] Inventor: Felix Blaschke, Erlangen, Fed. Rep. of Germany

[73] Assignee: Siemens Aktiengesellschaft, Munich and Berlin, Fed. Rep. of Germany

[21] Appl. No.: 733,302

[22] Filed: May 10, 1985

[30] Foreign Application Priority Data

May 18, 1984 [DE] Fed. Rep. of Germany ....... 3418617

[51] Int. Cl.$^4$ ............................................... G01L 3/22
[52] U.S. Cl. ................................................. 73/862.17
[58] Field of Search ......................... 73/862.17, 862.18

[56] References Cited

U.S. PATENT DOCUMENTS 3,667,290 6/1972 Hohn ................................ 73/862.19

FOREIGN PATENT DOCUMENTS 3225035 1/1984 Fed. Rep. of Germany .

Primary Examiner—Charles A. Ruehl
Attorney, Agent, or Firm—F. W. Powers; J. L. James

[57] ABSTRACT

An engine or a similar torque generator with internal torque M1 and moment of inertia T1 and an electrical drive with electrical torque M2 and moment of inertia T2 coupled thereto interchange an interchange torque MA over a coupling according to the equation $M1=(MA)(1+(5\ T))^2(1^2+(T1/T2))-M2,(T1/T2)$. Based on the actual values MA and M2 as well as a parameter $(T1/T2)^*$ and a model time constant $T^*$, a model value $M^*$ is computed in accordance with this function, which indicates the actual internal torque if said parameters correspond to the actual parameters. Thus, using supplemental set values $\Delta M2$ the preset electrical torque is varied and the parameters calibrated in such a manner that the effect of the M2 variation on the model value virtually disappears.

7 Claims, 6 Drawing Figures

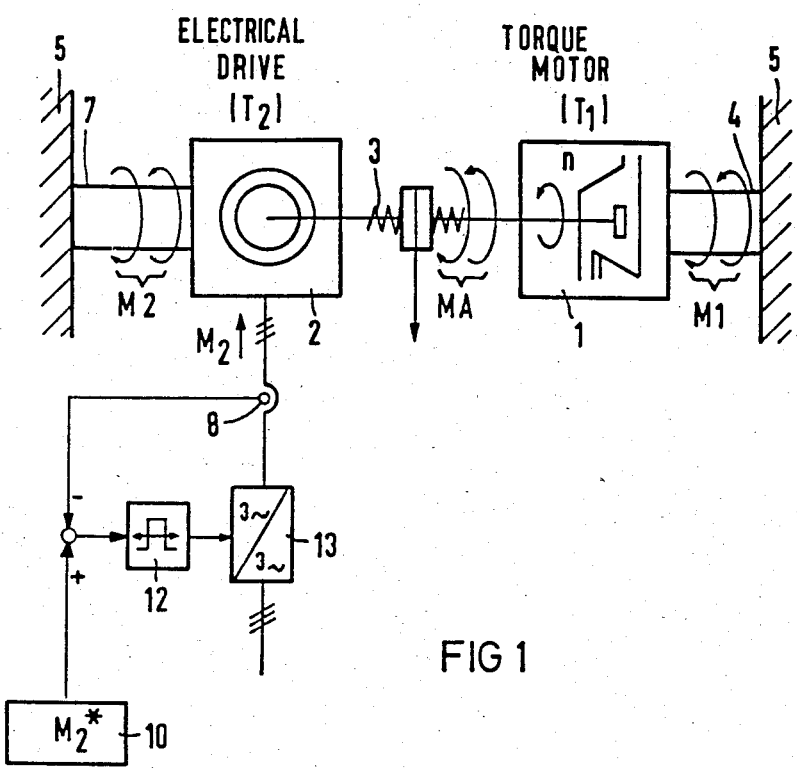
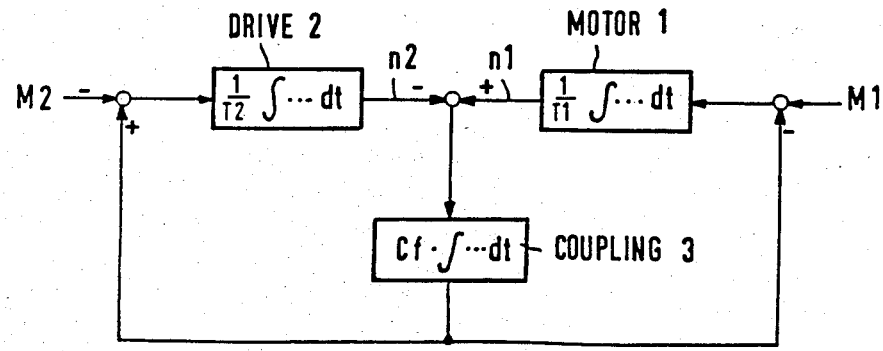

METHOD AND APPARATUS FOR DETERMINING THE TORQUE OF A TORQUE GENERATOR

BACKGROUND OF THE INVENTION

This invention relates to a method and apparatus for determining the torque of a torque generator.

Equipment used to test a torque generator which permits the testing of an internal combustion engine of a motor vehicle or the brake or the transmission or any other torque generating unit (in the following called "torque motor") under various operating conditions by having the internal combustion engine (torque motor) power-connected via its shaft to the shaft of an electrical drive is disclosed in German Offenlegungsschrift No. 3,225,035. The "internal" torque M1 generated by the combustion cycle in the motor is transmitted as a torsional moment to the mounting units which connect the motor to the foundations of the test stand. The electrical drive, e.g., an induction unit supplied by a frequency converter with a variable frequency, set at a certain electrical torque M2 by a set value and a control unit, transmits this torque M2 over its mount to the foundation of the test stand, also. The electrical drive is now in a position to simulate the load moments affecting the internal combustion engine by means of changes in its electrical torque which arise during the varying operating conditions of the vehicle. In evaluating the operating behavior of the internal combustion engine, it is not the torque itself which is generated by the electrical drive which is of interest; rather, it is the external torque ("interchange torque" MA) interchanged between the machine and the simulating drive using the shaft which is of interest.

The interchange torque can be determined by a measuring shaft installed between the induction machine and the engine. T1 defines the machine's moment of inertia and T2 the moment of inertia of the electrical drive.

For exact simulation of operating conditions one needs to know the internal torque M1 of the combustion engine which is identical with the electrical torque of the drive or the load torque of the vehicle as simulated by the drive only if the moment of inertia T1 of the machine is negligible in comparison to the load torque T2. In the other extreme case, in which T2 lcan be neglected, i.e., the drive shaft of the unit can virtually be moved with complete freedom, the internal torque M1 has been practically completely converted into the spin of the machine moment of inertia T1. In the general case, however, the relation is more complex, especially when the coupling between the induction machine and the engine is not completely rigid, but is capable, within limits, of some torsional motion. Accordingly, it will be appreciated that it would be highly desirable to provide a formula which takes the torsional motion into account.

It is an object of the present invention to provide a method and apparatus for determining the torque of a torque motor coupled to an electrical drive with a preset electrical torque.

An object of the invention is to provide a method and apparatus for measuring the torque motor torque which is interchanged with the electrical drive.

Another object of the invention is to provide a formula for determining interchange torque wich takes torsional motion into account.

SUMMARY OF THE INVENTION

Briefly stated, in accordance with one aspect of the invention, the foregoing objects are achieved by a method for determining the torque of a torque motor coupled to an electrical drive with a preset electrical torque (M2) wherein the torque motor torque interchanged with the drive (interchange torque MA) is being measured. The method includes determining a model value for the internal torque in accordance with a functional relationship which determines the internal torque of the torque motor as a function of the electrical torque, the interchange torque and the moments of inertia of the torque motor and drive, based on the preset electrical torque, the measured value of the interchange moment, and a parameter for the moment of inertia. The method also includes calibrating the parameter for the moments of inertia to a minimal dependency of the model value by varying the electrical torque.

In accordance with another aspect of the invention, an apparatus for determining the internal torque of a torque motor with an electrical drive generating a preset electrical torque and a torque coupling between the drive and motor with a torque take-up unit includes a calculating unit which calculates a model value for the internal torque based on the electrical torque, measured value of the take-up unit and a parameter for the moments of inertia. An input device connects a transitory supplement set value to vary the electrical torque. Also included is a calibration means for varying the parameters for the moments of inertia to minimalize the changes in the model value caused by the changes of the electrical torque.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

FIG. 1 is a structural schematic diagram of a test stand illustrating apparatus for determining the torque of a torque motor in accordance with the invention;

FIG. 2 is a control diagram mathematically showing the functional relationship of the components of FIG. 1;

DESCRIPTION OF A PREFERRED EMBODIMENT

Figure 3:
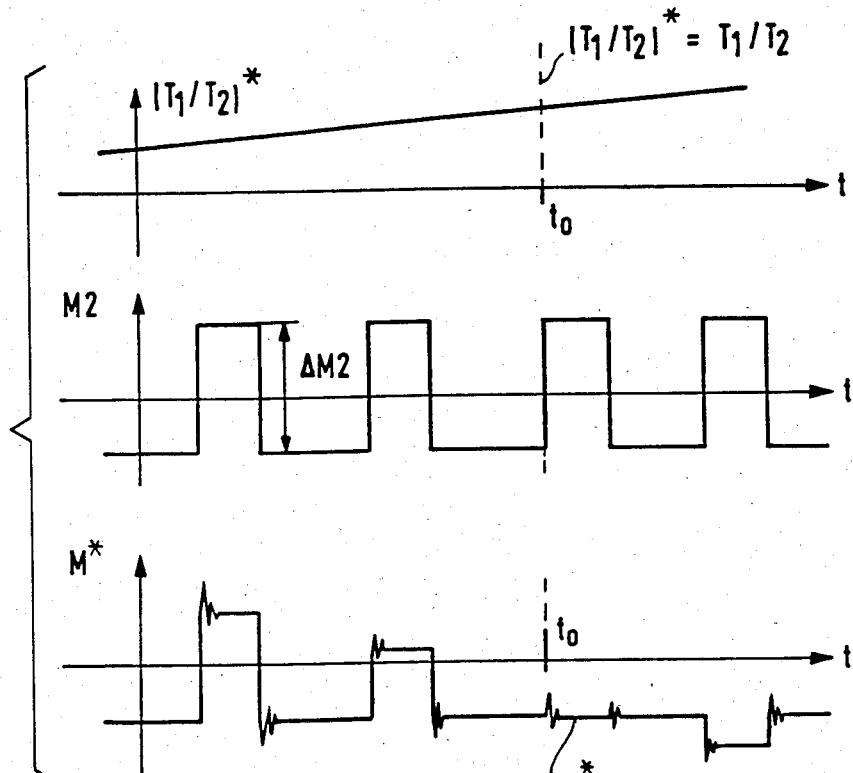
FIG. 3 graphically illustrates the variation of various parameters over time.

Referring to FIG. 1, a torque motor, such as an internal combustion engine 1, is power-connected to an electrical drive 2 via its shaft 3 and the shaft of the electrical drive 2. The torque M1 generated in the motor 1 is transmitted as a torsional moment to the mounting units 4 which connect the motor to the foundations 5 of the test stand. The electrical drive, for example, an induction unit supplied by a frequency converter 13 with variable frequency, set at a certain electrical torque M2 by a set value 10 and a control unit 12 transmits this torque M2 over its mount 7 to the foundation of the test stand.

The interchange torque MA interchanged between the motor and the drive can be determined by a measuring shaft installed between the drive and engine. The coupling between the drive and motor is not completely rigid, but is capable, within limits, of some torsional motion and is depicted as a spring in FIG. 1 with spring constant Cf. Normally, in the general case the interchange torque is expressed by the equation $$MA = (M1)(T2)/(T1+T2) + (M2)(T1)/(T1+T2). \quad (1)$$

When considering the spring contant Cf, i.e., in the case in which the power connection between the machine and load (vehicle or drive) is elastic:

$$MA = ((M1)(T2)/(T1+T2) + (M2)(T1)/(T1+T2))/((1+(s^2T^2))) \quad (2)$$

with the Laplace variable s and the time constant $$T = \sqrt{\frac{(T1)(T2)}{(T1+T2)(Cf)}}$$

FIG. 2 shows the structural schematic of the test stand in accordance with FIG. 1 which produces this functional relationship between M1, M2, MA and the moments of inertia T1 and T2 as well as to the rpms n1 and n2 of the test unit and the drive. FIG. 2 is a control diagram mathematically showing the functional relationship of the components in FIG. 1 using transfer functions.

Similar relationships prevail if the test unit is not an internal combustion engine, but, for example, an electrical or mechanical brake or coupling.

It is desired to determine the torque of the torque motor in the simplest manner. Accordingly, based upon the given torque M2, the measured value MA of the interchange torque and a parameter for the moment of inertia, a model M* is defined for the internal torque. This model value is determined in accordance with the functional relationship (1) between the known values M2 and MA and the (still unknown) inertia parameter (T1/T2) as follows:

$$M1 = (MA)(1+(s^2T^2))(T1+T2)/(T2) - (M2)(T1/T2) \quad (3)$$

which, when inputting an initially estimated parameter for the moment of inertia (T1/T2)*, is:

$$M^* = (MA)(1+(s^2T^{2*}))(1+(T1/T2)^*) - (M2)(T1/T2)^* \quad (4)$$

Ignoring initially the deviation of the estimated time constant T* for which the following applies, $$T^* = \sqrt{\frac{(T1/Cf)}{1 + (T1/T2)^*}}$$

one then derives from equations (1) and (4) the following which applies to the model value:

$$M^* = (M2)(T1/T2)\frac{1+(T1/T2)^*}{1+(T1/T2)} + (M1)\frac{1+(T1/T2)^*}{1+(T1/T2)} - \quad (5)$$

$$(M2)(T1/T2)^*$$

If the moment of inertia (T1/T2)* coincides with the actual moment of inertia ratio T1/T2, then the internal torque M1 of the machine is actually the same as the model value M*. The model value can thus be taken as the measured value of the internal torque of the machine to the extent that the parameter for the moment of inertia is simply equalized to the actual moment of inertia ratio. This equalization is undertaken in accordance with the method of the invention by varying the electrical torque M2 so that the parameter for the moment of inertia is calibrated to a minimal dependency of the model value on the variation of the electrical torque.

If one leaves the work point of the torque motor practically constant, i.e., by switching off the ignition when testing an internal combustion engine or by operating the machine only in idling condition, then the actual torque M1 determined only by friction losses is practically constant. Every preset change ΔM2 of M2 then only produces a change of the measured value MA. Conversely, in accordance with equation (5), this produces a change of M* as long as the parameter for the moment of inertia has not been equalized. FIG. 3 relates to the case in which the electrical drive is connected to a chain of additional pulses ΔM2 with an otherwise constant set value, while the parameter (T1/T2)* varies in a linear fashion over time. One thereby obtains the pattern shown for the model value M* whose oscillation induced by ΔM2 disappears at time point T0, at which point in time the parameter for the moment of inertia which is varied in a linear fasion indicates precisely the value corresponding to the actual circumstances.

Figure 4:
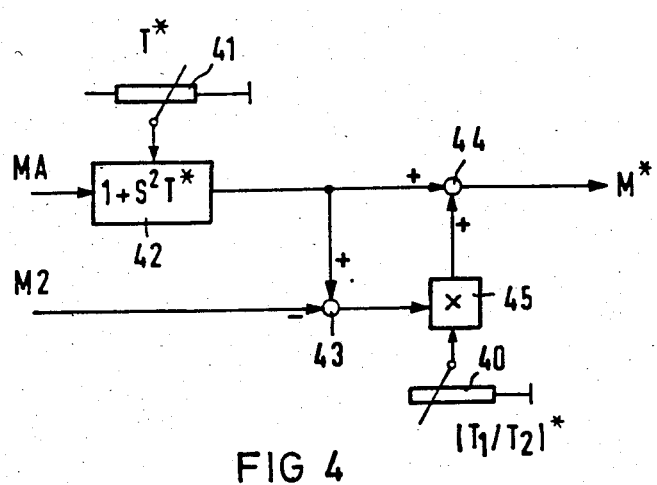
FIG. 4 diagrammatically illustrates a computer unit which generates a model value from measured and other values.

FIG. 4 shows a computer unit which generates the model value M* from the measured value of the interchange torque MA, the electrical torque M2 of the drive, as well as the parameter for the moment of inertia (T1/T2)* set on a calibrating unit 40 and a time constant T* set on a calibrating unit 41.

The measured value MA of the unit taking up the torque registering the interchange torque is initially routed over a time link 42 (time constant T*). The transmission behavior of this time link with the transimssion function $(1+s^2T^{*2})$ with the equalized time constant (T* = T) is inverse to the oscillation of the power coupling between the machine and the drive. The output variable of this time link is conveyed to two addition links 43 and 44, with the first addition link 43 serving to generate $(MA)(1+s^2T^{*2})-M2$. Its output signal is multiplied in a multiplier 45 by the parameter (T1/T2)* obtained from the calibration device (potentiometer 40) and thereupon similarly connected to the second addition link 44 from whose output the model value M* is obtained.

Figure 5:
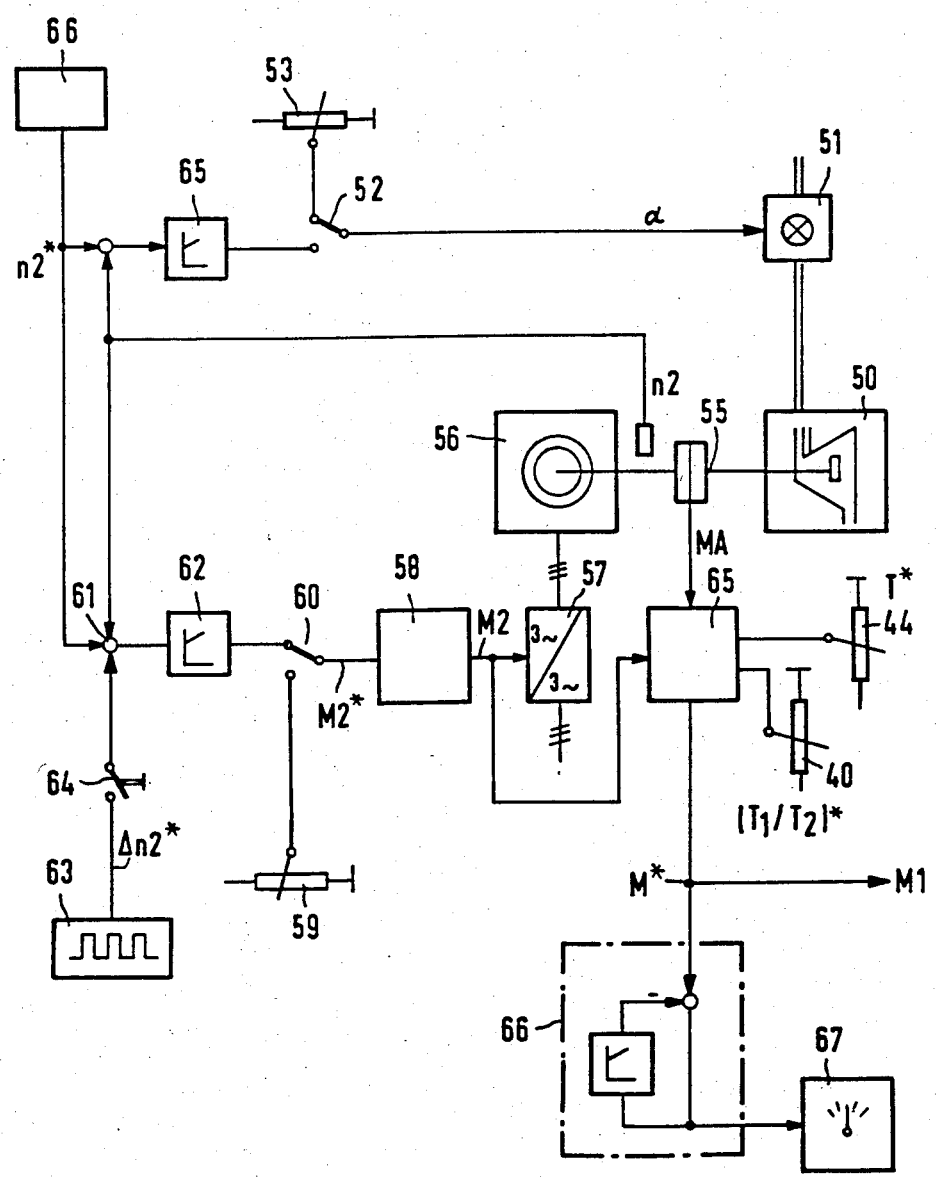
FIG. 5 illustrates a complete test stand for testing an internal combustion engine.

FIG. 5 shows a complete test stand to test an internal combustion engine. The engine 50 is controlled by a switch 52 preceding the carburetor 51 using a control signal corresponding to the position of a gas pedal, which in the position of switch 52 as shown in FIG. 5 designed to calibrate the parameter (T1/T2)* is set by a potentiometer 53 and determines the work point of the internal combustion engine. Preferably, the control signal determining the ignition of the engine is selected in accordance with the idle running of the machine, or it serves to completely shut down the ignition. The internal torque of the machine is then exclusively determined by friction losses.

The measuring shaft 55 connects the shaft of the machine 50 with the shaft of the drive 56 and supplies the value MA. Over control 58 of its power input 57 a set value M2* of the electrical output is preset for drive 56.

For simplicity, FIG. 5 shows a potentiometer 59 which serves to set a value which simulates a particular load condition. A switch 60 thereby allows presetting of the electrical torque in accordance with the output of a speed controller 61, which is required to calibrate the parameters (T1/T2)* and T*. The speed controller 61 keeps the rpm (and thus the work point of the idling machine) at a constant set value n2* and has a nominal-/actual value input 62 to which a supplemental pulse Δn2* can be connected to vary the electrical torque. This supplemental pulse is generated by a pulse generator 63 which can be released by a release key 64.

Aside from the switch position shown, when reversing the switch 52, one produces a condition in which the gas pedal control signal of the engine controlling the ignition is controlled by a speed controller 65 in accordance with the rpm nominal/actual value differential. The set value n2* can in this context be set by a program control 66 to coordinate with the preset value M2* to simulate a particular load torque in accordance with a test program. The output signal MA of the torque take-up unit 55 is now converted by the calculating unit 65 (shown in FIG. 4) using the parameter values T* and (T1/T2)* obtained from the calibration devices 40 and 44 into the model value M*. The model value M* is identical to the actual value M1 with equalized parameters and represents the sought-for value of the internal torque of the test machine in the simulated operating status.

The parameters can be calibrated using the device shown in FIG. 5 by having the d.c. voltage component in model value M* suppressed initially by a particular unit 66. After a minor smoothing the a.c. voltage component of the model value is conveyed to an indicator unit 67, which, in accordance with the beat of the pulse generator 63, shows oscillations around zero.

The movement of the indicator unit 67 can now be observed while changing the potentiometer setting (T1/T2)* and the potentiometer 40 can be manually equalized to a minimal action. Given an adequately low frequency of pulses Δn2*, the indicator unit could be a simple dial, but of course automatic equalization can also be utilized. Subsequently, parameter T* can also be calibrated, whereby, for example, while optically observing on an oscillograph, the oscillations which model value M* still displays after equalizing the parameters (T1/T2), can be made to practically disappear by changing the setting of potentiometer 41. This equalization can also be automated.

This calibration thereby supplies not only the optimal setting, wherein the calculating unit for a measured value MA of the interchange torque indicates the correct value for the internal torque M1 of the test unit, but the potentiometer settings also permit determination of the moment of inertia T1 of the test unit and the spring constant Cf of the shaft which can also be of advantage for testing machines using the test stands.

It will now be understood that there has been presented a simple method for determining the torque of a torque motor coupled to an electrical drive with a preset electrical torque (M2) wherein the torque motor torque interchanged with the drive ("interchange torque" MA) is being measured. The method includes determining a model value M* for the internal torque (M1) in accordance with a functional relationship which determines the internal torque (M1) of the torque motor as a function of the electrical torque (M2), the interchange torque (MA) and the moments of inertia of the torque motor and drive, based on the preset electrical torque, the measured value of the interchange moment, and a parameter for the moment of inertia (T1/T2)*. The method also includes calibrating the parameter for the moments of inertia (T1/T2)* to a minimal dependency of the model value M* on the variation Δn2* of the electrical motor by varying the electrical torque and registering the model value as the value of the internal torque.

There has also been presented an apparatus for determining the internal torque of a torque motor with an electrical drive generating a preset electrical torque and a torque coupling between drive and motor with a torque take-up unit. The apparatus includes a calculating unit which calculates a model value for the internal torque based on the electrical torque, the measured value of the take-up unit, and a parameter for the moments of inertia and an input device connecting a transitory supplemental set value to generate short-term variations in the electrical torque. The apparatus also includes calibration means for varying the parameters for the moments of inertia to minimalize the changes in the model valve caused by the changes of the electrical torque.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

Now, the normal simulation of a vehicle will be described where the parameters T* and (T1/T2)* are adjusted and the switches 52 and 60 are switched over to their other position. The complete simulating procedure uses a test program for setting M2* (according to German Offenlegungsschrift 32 25 035 and FIG. 6) instead of potentiometer 59 shown in FIG. 5.

Under real conditions, the vehicle to be simulated has a moment of inertia T2' and a torque M2' which, for instance, is created by gravitation if the vehicle drives down a hill. To insure that torque M1 of the engine under test conditions (M2, T2) creating the acceleration n2 (time change of the rotational speed n2) equals the torque of the engine under real conditions (M2', T2'), the simulated torque M2' has to be corrected in accordance with the difference of T2 and T2'.

Figure 6:
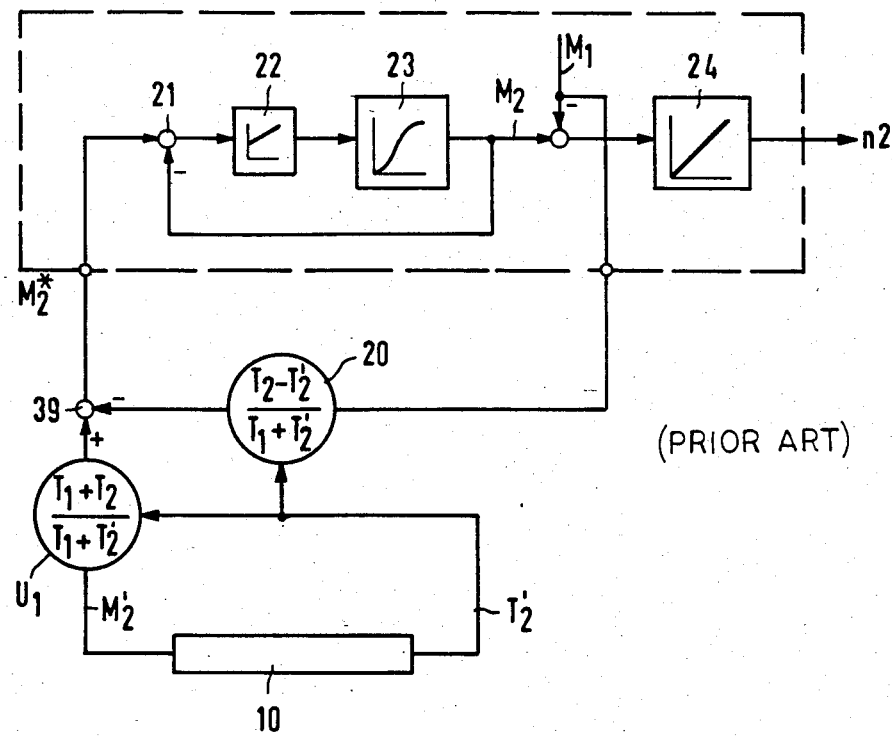
FIG. 6 is a control diagram similar to FIG. 2 but illustrating a prior art apparatus.

This correction can be done by correcting M2' with a calculated torque M, calculated from M1, at summing point 39 of FIG. 6. The values M2' and M1 are modified in calculating stages u2 and 20 by functions which depend on the parameters T1, T2 and T2'.

The simulated values M2' and T2' can be taken from a test program 10' and the modifying functions as well as the sign at the summing point 39 are selected out of various formulas given in the German Offenlegungsschrift. A preferred selection is $$M2^* = (T1+T2)/(T1+T2')(M2') - (T2-T2')/(T1+T2')(M1).$$

The value M2* now determines the torque to be supplied by the electrical drive and is compared with the actual value M2 at comparator 21. The actual value may be calculated in the control unit 12 of FIG. 1, which is simply shown as a regulator 22 in FIG. 6. The inverter 13 and the electrical part of the electrical drive are represented by a dynamic member 23 with output M2. Since the moments of inertia T1 and T2 are accelerated by the difference M2−M1, the structure of FIG. 6 is completed by an integrator 24 with the speed n2 at its output.

If, for example, a field oriented driven, converter fed, polyphase machine whose flux is kept at a constant set point is used as the drive, the electrical torque is proportional to the flux vertical component of the stator current. The field oriented control unit of the inverter already calculates the flux vertical component of stator current from actual stator current and voltage values. Therefore, the vertical component can be used as actual electrical torque value M2 for calculating M* and controlling the inverter 13. This configuration insures a very fast response of the drive to any change in the engine and its control signal α.

What is claimed as new and desired to be secured by Letters Patent of the United States is:

1. A method for determining the torque of a torque generator coupled to an electrical drive with a controllable electrical torque wherein the torque generator torque interchanged with the drive ("interchange torque") is being measured, comprising:
   determining a model value for the internal torque in accordance with a functional relationship which determines the internal torque of the torque generator as a function of the electrical torque, the interchange torque (MA) and the moments of inertia of the torque generator and drive, based on the electrical torque, the measured value of the interchange torque, and a parameter for the moments of inertia;
   calibrating the parameter for the moments of inertia to a minimal dependency of the model value on the variation of the electrical torque by varying the electrical torque, and
   registering the model value as the value of the internal torque.

2. A method in accordance with claim 1, including connecting a constant set value and pulsating supplemental set values to the drive for varying the electrical torque and, adjusting the parameter for the moment of inertia until the model value remains practically unchanged when connecting the supplemental set values.

3. A method in accordance with claim 1, including obtaining the measured value of the interchange torque from a torque take-up unit using a time link with variable time constant and a time pattern which is inverse to the time pattern of an oscillation, and calibrating the time constant to minimal oscillation of the model value.

4. A method in accorance with claim 1, including producing the functional relationship between the model value M*, the measured value MA of the interchange torque, and the electrical torque M2 from a parameter (T1/T2)* corresponding to the moment of inertia ratio of the torque generator and the drive wherein M*−(MA)(1+(T1/T2)*)−(M2)(T1/T2)*.

5. A method in accordance with claim 1, including generating a time constant T* and defining a functional relationship between the model value M*, the measured value (MA) of the interhange torque, the electrical torque M2, the parameter for the moment of inertia (T1/T2)* and a transmission function $(1+(s^2T^{*2})$ whereby $$M^* = (MA)(1+(s^2T^{*2}))(1+(T1/T2)^*) - (M2)(T1/T2)^*.$$

6. A method in accordance with claim 1, wherein the torque generator is an internal combustion engine and including switching the engine to neutral or off and varying the electrical torque by adding a regular series of additional pulses to the rmp or torque set value of the electrical drive and determining the internal torque of the internal combustion engine.

7. An apparatus for determining the internal torque of a torque generator with an electrical drive generating a controllable electrical torque and a torque coupling between drive and generator with a torque take-up unit comprising:
   a calculating unit which calculates a model value for the internal torque based on the electrical torque, the measured value of the take-up unit, and a parameter for the moments of inertia;
   an input device connecting a transitory supplemental set value to generate short-term variations in the electrical torque, and
   calibration means for varying the parameters for the moments of inertia to minimalize the changes in the model value caused by the changes of the electrical torque.

* * * * *